United States Patent Office 3,048,628
Patented Aug. 7, 1962

3,048,628
OXIDATION PROCESS
John W. Lynn, Charleston, and Richard L. Roberts, Milton, W. Va., assignors to Union Carbide Corporation, a corporation of New York
No Drawing. Filed May 22, 1959, Ser. No. 814,989
3 Claims. (Cl. 260—537)

This invention relates to the production of butanetricarboxylic acids. In a particular aspect, this invention relates to a method for producing 1,2,4-butanetricarboxylic acids by nitric acid oxidation of alicyclic ester derivatives.

Butanetricarboxylic acids are valuable compounds which are useful in numerous applications. These polybasic acids can be employed in the preparation of cross-linked polyesters for use in rigid polyester foams. Trialkyl ester derivatives of these polybasic acids are excellent plasticizers for polyvinyl halide resins. The acids are also useful as epoxy resin hardeners. Other promising applications for these polybasic acids are presently being developed.

The literature is replete with methods for synthesizing 1,2,4-butanetricarboxylic acid. One of the earliest methods recorded involves the Michael condensation of methylenesuccinic acid esters with malonic ester. A more recent publication discloses the preparation of 1,2,4-butanetricarboxylic acid by the condensation of acrylonitrile with 1,1,2-ethanetricarboxylic acid. The art methods are generally circuitous and uneconomical. In the investigation of synthetic methods which led to the instant invention, it was found that nitric acid oxidation of 3-cyclohexane derivatives appears to be potentially the most attractive as a commercial method for producing 1,2,4-butanetricarboxylic acids.

Oxidation of 3-cyclohexene-1-carboxylic acids and 3-cyclohexene-1-carbonitriles to 1,2,4-butanetricarboxylic acids can be accomplished in a satisfactory manner; however, these starting materials are relatively expensive. The most economically attractive starting materials are the 3-cyclohexene-1-carboxaldehydes which are readily available in excellent yields from the Diels-Alder reaction of conjugated diene derivatives with acrolein derivatives. The Diels-Alder combination of butadiene and acrolein provides a particularly attractive raw material. It has been found, however, that the direct nitric acid oxidation of 3-cyclohexene-1-carboxaldehydes does not proceed satisfactorily by techniques which are successful with the corresponding 3-cyclohexene-1-carboxylic acid and 3-cyclohexene-1-carbonitrile derivatives. Poor yields of contaminated 1,2,4-butanetricarboxylic acids are produced.

Accordingly, it is a main object of this invention to provide a method for producing 1,2,4-butanetricarboxylic acids by the nitric acid oxidation of 3-cyclohexene materials derived from the Diels-Alder interaction of butadiene and acrolein derivatives.

It is another object of this invention to provide a method for producing 1,2,4-butanetricarboxylic acids by nitric acid oxidation of 3-cyclohexene derivatives that is practical for commercial application.

Other objects and advantages will become apparent from the accompanying specification and disclosure.

One or more of the objects of this invention are accomplished by a process which comprises oxidizing with nitric acid at a temperature between about 40° C. and 80° C. an ester characterized by the formula:

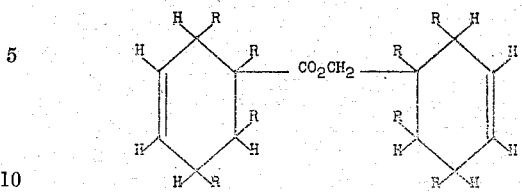

wherein R is a member selected from the group consisting of hydrogen and lower alkyl radicals containing between one and four carbon atoms.

Illustrative of lower alkyl radicals are methyl, ethyl, propyl, isopropyl, butyl, isobutyl, and the like. One or more lower alkyl groups can be present in the esters at the designated ring positions without deleteriously affecting the transformation of the esters into 1,2,4-butanetricarboxylic acids. It is preferred that the total number of carbon atoms in said R lower alkyl substituents does not exceed twelve on each cyclohexene nucleus. The ester particularly amenable to the process of this invention is the derivative wherein each of the R substituents is hydrogen, i.e., 3-cyclohexenylmethyl 3-cyclohexene-1-carboxylate.

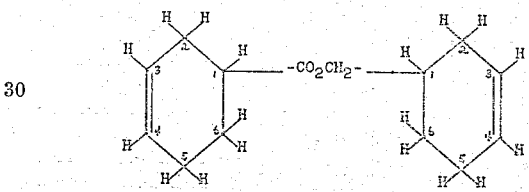

Other useful esters include 2-methyl-4-cyclohexenylmethyl 2-methyl-4-cyclohexene-1-carboxylate, 6-methyl-3-cyclohexenylmethyl 6-methyl-3-cyclohexene-1-carboxylate, and the like.

The practice of this invention is meant to include the oxidation of esters having the two-position and five-position carbon atoms of the 3-cyclohexene structures joined by a methylene group. These esters correspond to the structure.

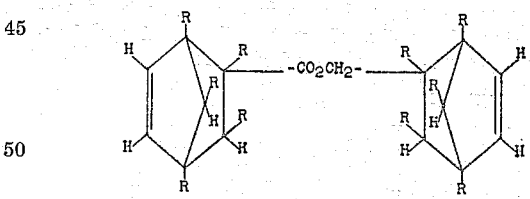

wherein R is hydrogen or lower alkyl radicals as previously defined.

The oxidation process can be conducted employing a ratio of between five and twenty moles of nitric acid per mole of ester derivative, and the preferred ratio is between ten and fifteen moles of nitric acid per mole of ester. The nitric acid employed generally can have a concentration of 40 to 90 weight percent, and preferably has an acid concentration of 50 to 70 weight percent. It is pointed out that two moles of 1,2,4-butanetricarboxylic acid derivative are theoretically produced from each mole of ester oxidized.

The temperature employed in the oxidation reaction can vary between about 40° C. and 80° C., and the preferred temperature range is between 50° C. and 70° C. Temperatures less than 40° C. and higher than 80° C., e.g., 35° C. to 100° C., can be employed if optimum performance is not a consideration.

The reaction time for the oxidation process varies over a broad range of time depending on such factors as temperature, the concentration and relative molar ratio of the acid and ester reactants, and the presence or absence of a catalyst. Generally, reaction times in the range between about 0.5 hour and 10 hours are suitable.

The oxidation reaction can be performed with or without a catalyst; however, it has been observed that the reaction proceeds more efficiently and is easier to control when a catalyst is employed. Effective catalysts include the transition elements and their salts, partitcularly such metals as manganese, iron, copper, nickel, molybdenum, cobalt and vanadium, and the salts of these metals. Illustrative of useful catalysts are ammonium metavanadate, alkali metal vanadates, alkali metal molybdates, ammonium molybdtes, cobalt acetate, cobalt naphthenate, manganese acetate, cobalt oxide, silver oxide, nickel oxide, iron oxide, cobalt sulfate, manganese sulfate, cobalt phosphate, manganese phosphate, cobalt nitrate, manganese nitrate, cobalt halides, manganese halides, cobalt carbonate, copper, cupric nitrate, cupric chloride, cupric phosphate, cupric oxide, copper sulfate, and the like. The preferred catalysts are those selected from the group consisting of ammonium and alkali metal vanadates and molybdates. Such catalysts include ammonium vanadate, sodium vanadate, potassium vanadate, ammonium molybdate, sodium molybdate and potassium molybdate. The catalyst is employed in an amount varying between 0.01 and 1.0 weight percent, based on the total weight of reactants, i.e., the total weight of nitric acid and ester derivative. It is particularly advantageous to employ a catalyst mixture of powdered copper metal or a copper salt and one or more of the groups consisting of ammonium and alkal metal vanadates and molybdates. The copper metal and copper salts are preferably employed in the catalyst mixture in an amount between about 0.025 and 0.25 weight percent, based on the total weight of nitric acid and ester derivative.

The ester compounds that are oxidized in the process of this invention are most advantageously prepared by the transformation of appropriate 3-cyclohexene-1-carboxaldehydes under the conditions of the Tishchenko Reaction [1]. This reaction provides for the condensation of aldehydes to esters in the presence of alcoholates. Other well-known chemical transformations which proceed by a similar chemical mechanism are the Meerwein-Ponndorf-Verley Reduction, Oppenauer Oxidation and Cannizzaro Reaction. The Tishchenko Reaction is illustrated in the following reaction scheme by the conversion of 3-cyclohexene-1-carboxaldehyde in the presence of aluminum ethoxide to the "Tishchenko" ester 3-cyclohexenyl-methyl 3-cyclohexene-1-carboxylate:

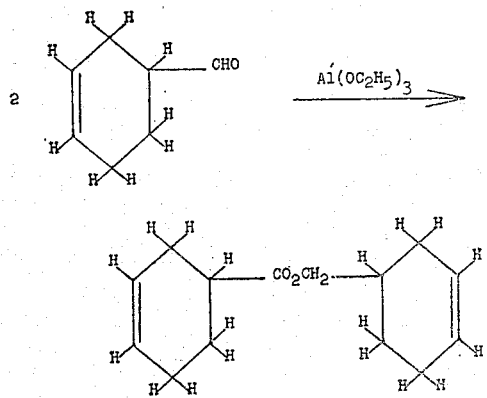

[1] V. Tishchenko, J. Russ. Phys. Chem. Soc., 38, 355, 482 (1906).

The Tischenko Reaction permits the formation of ester from the aldehyde in high yield. The synthesis reaction sequence of preparing "Tishchenko" esters and subsequently oxidizing the "Tishchenko" esters to 1,2,4-butanetricarboxylic acids with nitric acid is, in effect, an excellent method of converting 3-cyclohexene-1-carboxaldehydes to 1,2,4-butanetricarboxylic acids without the low yields and poor products that are the consequence of the direct oxidation of the aldehydes with nitric acid as mentioned above. Hence, by the practice of this invention, it is possible to (1) gain the economic advantage of inexpensive raw materials such as butadiene and acrolein which are combined in the Diels-Alder reaction to prepare the intermediate 3-cyclohexene-1-carboxaldehydes that are convertible to the "Tishchenko" ester starting materials of this invention, while (2) enjoying the ease and efficiency of nitric acid oxidation. Another advantage of using "Tishchenko" esters is that they can be recovered as crude products from the Tishchenko Reaction and employed directly in the process of this invention without recourse to intermediate purification steps.

The Tishchenko Reaction is also applicable to the preapration of bicyclo ester derivatives. The following reaction sequence illustrates the preparation of a bicyclo "Tishchenko" ester, and the conversion of the ester to a 1,2,4-cyclopentanetricarboxylic acid by the process of this invention:

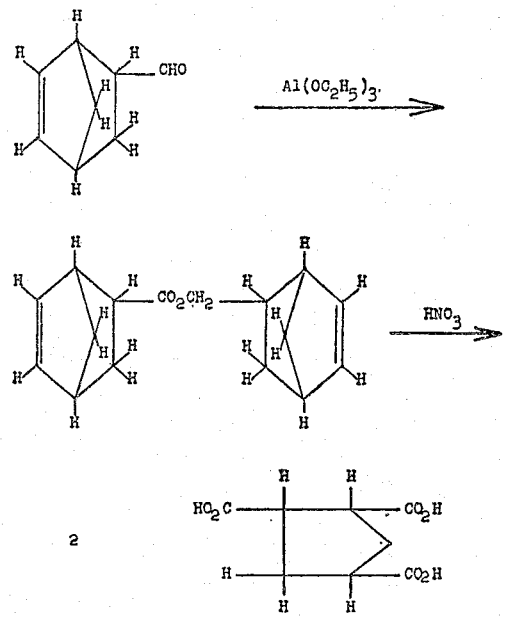

The bicycloheptenylcarboxaldehyde starting materials are readily prepared by the Diels-Alder reaction of acrolein and lower alkyl-substituted acrolein derivatives with cyclopentadiene and lower alkyl-substituted cyclopentadiene derivatives.

The oxidation process of this invention can be conducted either batchwise or continuously. In a batch process, it is convenient to initially charge the nitric acid, water and catalyst to the reaction vessel, and add the 3-cyclohexene ester derivative dropwise to the mixture at a controlled rate. The process can be conducted in a continuous manner by charging a stream of aqueous nitric acid and catalyst mixture into the end of a tubular reactor simultaneously with a stream of 3-cyclohexene ester derivative and continuously removing reaction product mixture from the other end of the reactor after a suitable residence time, e.g., a period between two and four hours at a temperature between 50° C. and 75° C.

The 1,24-butanetricarboxylic acid product can be recovered in one method by cooling the crude reaction mixture and separating the crystalline product that is precipitated. In another method, the crude reaction mixture is stripped of excess water and nitric acid by vacuum distillation, then the residuum is mixed with an alcohol such as ethanol, and, after causing ester formation by heat treatment, the crude reaction mixture is distilled and a 1,2,4-butanetricarboxylic acid product is recovered in the form of its ester. One advantage of this latter method of recovery is that by the use of a suitable alcohol or alcohol mixture a 1,2,4-butanetricarboxylate is obtained which has direct utility as a plasticizer for vinyl halide resins.

The following examples will serve to illustrate specific embodiments of the invention.

*Example 1*

This example illustrates the preparation of a starting material of this invention by the Tishchenko Reaction.

A slurry of aluminum isopropoxide (2 percent by weight of the 3-cyclohexene-1-carboxaldehyde charge) in previously prepared 3-cyclohexenylmethyl 3-cyclohexene-1-carboxylate (0.5 mole) was charged to a reaction vessel fitted with an agitator and means for external cooling. Over a period of approximately 8.5 hours, 3-cyclohexene-1-carboxaldehyde (40 moles) was fed continuously to the reaction vessel while holding the reaction temperature at 25–30° C. with external cooling. After all the aldehyde had been fed, the reaction mixture was allowed to stir at the above temperature for an additional two-hour period, after which the catalyst was neutralized by the addition of an excess of acetic acid. A gel-like precipitate containing the neutralized catalyst was removed by filtration, dissolved in benzene and washed with water to remove the aluminum salt. Distillation of the benzene layer yielded product ester representing approximately 50 percent of the original weight of aluminum gel.

The main body of the product-containing filtrate was distilled under reduced pressure to give 3-cyclohexenylmethyl 3-cyclohexene-1-carboxylate (boiling point, 100° C. at 0.3 millimeter of mercury, 103° C. at 0.7 millimeter of mercury; $n_D^{30}$, 1.4933; purity by saponification, 99.6 percent) in 90 percent yield, based on starting aldehyde. Infrared analysis of the distilled material was consistent with the proposed product structure.

*Analysis.*—Calculated for $C_{14}H_{20}O_2$: C, 76.32; H, 9.15. Found: C, 76.37; H, 9.57.

*Example 2*

Nitric acid (15 mole, 50 percent solution), ammonium metavanadate (0.1 weight percent) and copper powder (0.25 weight percent) were charged to a reaction flask and agitated to effect solution of the catalyst mixture. The mixture was warmed to a temperature of 50° C. with stirring and, over a period of approximately one hour, a crude mixture of 3-cyclohexenylmethyl 3-cyclohexene-1-carboxylate (2 moles) prepared by the Tischenko Reaction was added dropwise to the catalyst mixture.

After the reaction period, the product mixture was stripped of water and excess nitric acid by passing through a steam-heated tubular flash evaporator at about 20 millimeters of mercury vacuum. After two passes through the evaporator, the concentrated mixture was allowed to cool to separate crystalline powder. Solid product was filtered and washed with ethyl ether to yield 253 grams of 1,2,4-butanetricarboxylic acid (melting point, 91° C. to 92° C.).

The filtrates from the product recovery were recycled and oxidized with 11 moles of nitric acid (50 percent solution) for a period of two and one-half hours at a temperature of 50° C. to 106° C. Cooling of the product mixture to separate solid product, and workup of the filtrates, afforded 1,2,4-butanetricarboxylic acid in a total yield of 58.5 percent of the theoretical.

The bicycloheptenylcarboxaldehydes defined previously are readily converted to 1,2,4-cyclopentanetricarboxylic acids by the procedure described in this example.

*Example 3*

Nitric acid (30 moles, 70 percent solution) was charged to a five-liter flask containing ammonium metavanadate (3 grams) and metallic copper powder 7.5 grams). 3-cyclohexenylmethyl 3-cyclohexene-1-carboxylate (2 moles), prepared by the Tishchenko Reaction and purified by distillation, was added dropwise to the catalyst mixture over a period of 1.75 hours. The reaction temperature was maintained in a range between 50° C. and 60° C. during the reaction period for an additional four hours after the addition period. Nitrogen oxides recovered during the reaction were fed, with excess oxygen, to two glass-packed oxidizer-absorber towers for recovery of nitric acid.

Water and excess nitric acid were removed by passing the crude reaction mixture through a steam-heated tubular flash evaporator at about 20 millimeters of mercury vacuum. The concentrated mixture was allowed to cool and a crystalline product was recovered by filtration. The crystalline product yielded 400 grams of 1,2,4-butanetricarboxylic acid (melting point, 94° C. to 98° C.). The total yield of 1,2,4-butanetricarboxylic acid as crystalline product and in the filtrates was 61.7 percent of theoretical. The nitric acid consumption was approximately 4.5 moles per mole of 1,2,4-butanetricarboxylic acid produced.

The crystalline product was esterified with ethanol and triethyl 1,2,4-butanetricarboxylate was recovered by distillation (boiling point, 112° C. to 115° C. at 0.4 millimeter of mercury, $n_D^{30}$, 1.4361).

*Analysis.*—Calculated for $C_{13}H_{22}O_6$: C, 56.92; H, 8.08. Found: C, 57.23; H, 7.96.

*Example 4*

This example illustrates the poor results obtained when direct nitric acid oxidation of 3-cyclohexene-1-carboxaldehyde to 1,2,4-butanetricarboxylic acid is attempted.

A mixture of 70 percent nitric acid (25 moles), water (to dilute the nitric acid to 50 percent), and ammonium metavanadate (0.1 percent by weight of reactants) was charged to a reaction flask and heated to 40° C. Over a period of 6.25 hours, 3-cyclohexene-1-carboxaldehyde (5 moles) was charged to the stirred mixture, while applying external cooling to remove the heat of reaction and maintain a reaction temperature of 40° C. to 50° C. During the early stages of the feed period, extreme difficulty was experienced in initiating the exothermal reaction. When reaction was eventually initiated, it became uncontrollable, resulting in rapid rise of reaction temperature and consequent loss of some reaction mixture. In addition to the difficulty encountered with control of the reaction rate, a considerable quantity of polymeric material was formed in the reaction vessel, making agitation very difficult.

After the feed was completed, the reaction mixture was held at 40° C. to 50° C. for an additional four hours, filtered to remove insoluble salts and polymeric material, and passed through a steam-heated, tubular vapor-lift evaporator under reduced pressure (about 20 millimeters of mercury) to remove most of the unreacted nitric acid and excess water. The concentrated product mixture was chilled to crystallize the contained 1,2,4-butanetricarboxylic acid, which was removed by filtration and recrystallized from an acetone-benzene mixture. There was recovered from the recrystallization 305 grams of dry, crystalline product acid (purity by titration, 94 percent; melting point, 106–112° C.) a yield of 30.2 percent of the theoretical, based on the aldehyde charged.

What is claimed is:

1. A process for producing 1,2,4-butanetricarboxylic acid which comprises reacting with nitric acid of a concentration of 40 percent to 90 percent by weight, at a temperature of 40° C. to 80° C., 3-cyclohexenylmethyl 3-cyclohexene-1-carboxylate, the mole ratio of nitric acid to ester being within the range of 5 to 20 moles of nitric acid to one mole of ester; said reaction taking place in the presence of between 0.01 and 1.0 weight percent, based on the total weight of nitric acid and ester, of a catalyst selected from the group consisting of ammonium vanadate, alkali metal vanadates, ammonium molybdate and alkali metal molybdates.

2. The process as claimed in claim 1 wherein 10 moles to 15 moles of nitric acid to one mole of ester is present in the reaction mixture formed.

3. The process of claim 1 wherein said reaction mixture contains additionaly between about 0.025 and 0.25 weight percent, based on the total weight of nitric acid and ester, of a catalyst selected from the group consisting of copper and salts of copper.

References Cited in the file of this patent

UNITED STATES PATENTS

| | | |
|---|---|---|
| 2,203,628 | Hopff et al. | June 4, 1940 |
| 2,530,512 | Drewitt | Nov. 21, 1950 |
| 2,698,339 | Hawkins et al. | Dec. 28, 1954 |

FOREIGN PATENTS

| | | |
|---|---|---|
| 769,270 | Great Britain | Mar. 6, 1957 |